United States Patent [19]
Mochizuki

[11] 4,401,364
[45] Aug. 30, 1983

[54] OPTICAL REPEATER SYSTEM FOR OPTICAL COMMUNICATION

[75] Inventor: Kiyofumi Mochizuki, Tokyo, Japan

[73] Assignee: Kokusai Denshi Denwa Kabushiki Kaisha, Tokyo, Japan

[21] Appl. No.: 260,463

[22] Filed: May 4, 1981

[30] Foreign Application Priority Data

May 26, 1980 [JP] Japan ............................ 55-068827

[51] Int. Cl.³ ............................................... G02B 5/14
[52] U.S. Cl. ........................... 350/96.16; 350/96.15
[58] Field of Search .................... 350/96.15, 96.16; 455/601, 610, 612

[56] References Cited

U.S. PATENT DOCUMENTS

| | | | |
|---|---|---|---|
| 4,068,952 | 1/1978 | Erbert et al. | 350/96.16 |
| 4,136,929 | 1/1979 | Suzaki | 350/96.16 |
| 4,166,212 | 8/1979 | Judeinstein | 350/96.16 |
| 4,261,639 | 4/1981 | Kogelnik et al. | 350/96.15 |

*Primary Examiner*—David K. Moore
*Attorney, Agent, or Firm*—Pollock, VandeSande & Priddy

[57] ABSTRACT

An optical repeater system for optical communication that comprises a light source for providing a light of frequency $\nu_0$, and a beam splitter for synthesizing said light from said light source and optical communication signal pulses including Stokes light corresponding to said frequency $\nu_0$ introduced by Raman effect in the optical fibers, the optical repeater system being characterized in that the signal pulses are amplified with induced Raman effect in the optical fiber caused by the light and the dispersion characteristic of the optical fiber.

5 Claims, 14 Drawing Figures

(a)

(b)

(c)

(a)

(b)

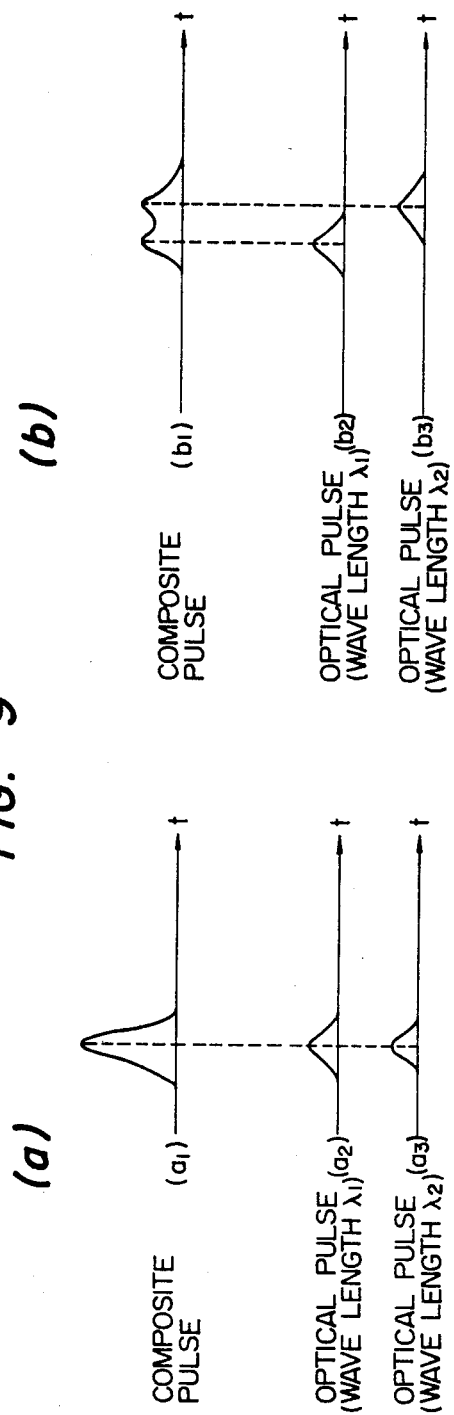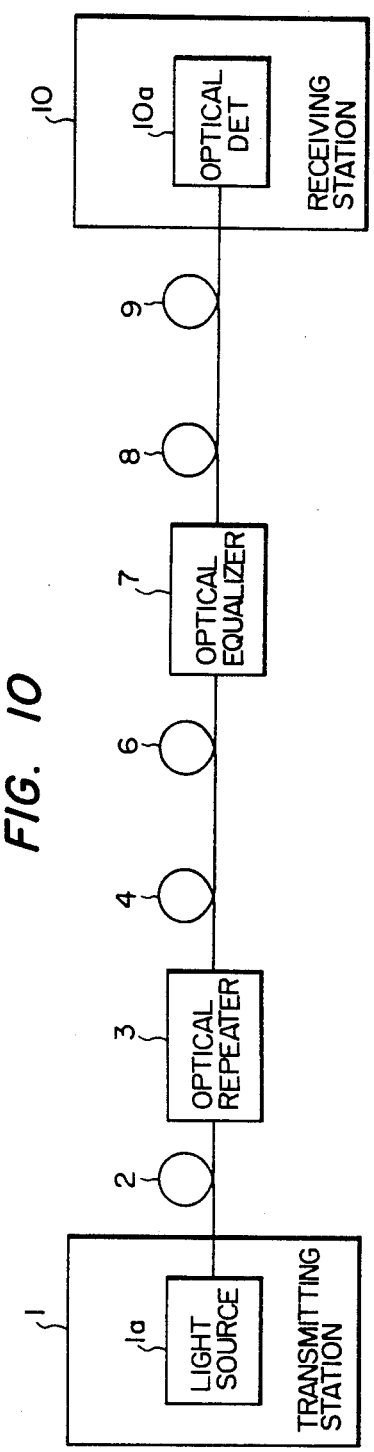

OPTICAL REPEATER SYSTEM FOR OPTICAL COMMUNICATION

THE FIELD OF THE INVENTION

This invention relates to an optical repeater system for optical communication utilizing an optical fiber.

DESCRIPTION OF THE PRIOR ART

The optical repeaters for optical communication, developed up to date, comprises systems wherein the light detected by a light receiver is converted to an electric signal, which again modulates the light after it is amplified.

For the system utilizing an optical repeater having the conversion process of light-electricity-light, the attenuation of the signal pulse is shown in FIG. 1, where the orthogonal axis indicates signal pulse level and the abscissa the length L of the fiber from a transmitting station. The alphabetic notation $A_1$ denotes a first optical repeater and the notation $A_2$ a second optical repeater. The signal pulse is attenuated exponentially because of the loss in the fiber between the transmitting station and the first optical repeater $A_1$. In the first optical repeater $A_1$, conversion of light-electricity-light is carried out by the system described above, and the signal pulse is amplified. The signal pulse amplified at the first optical repeater $A_1$ is again attenuated exponentially until it reaches the second optical repeater $A_2$. The same process is repeated in the transmission to the receiving station.

As the optical repeater of such prior art system is provided with electric signal processing circuits which require a number of electric components, thereby increasing probability of trouble, it is less reliable. In addition, the modulation of laser beam by the electric signal might increase the width of the oscillation spectrum.

SUMMARY OF THE INVENTION

It is an object of this invention to provide an optical repeater system free from all the deficiencies involved in the prior art technology mentioned above, and this is attained by using induced Raman effect in the optical fiber so that the signal light is directly amplified by an exciting light.

The optical repeater of the present invention comprises a light source for providing a light of frequency $\nu_O$, and a beam splitter such as a half mirror for synthesizing said light from said light source and a signal pulse including Stokes light corresponding to said frequency $\nu_O$ generated by Raman effect in the optical fibers, and the optical repeater system is characterized in that the signal pulses are amplified with induced Raman effect in the optical fiber caused by the light and dispersion characteristic of the optical fiber.

BRIEF DESCRIPTION OF THE DRAWING

FIG. 9 is an illustration for use in explaining the distortion of a wave at the receiving station when a light wave containing a plurality of wavelengths is transmitted, FIGS. 9(a) and 9(b) respectively illustrating a pulse with several wavelengths before and after propagation through a fiber.

FIG. 10 shows further embodiment of this invention, which is an optical repeater system for optical communication, capable of shaping the distorted wave.

DETAILED DESCRIPTION OF THE INVENTION

First, an explanation will be made of the principle of this invention. When we examine through a spectroscope a scattered light from a substance onto which a light (pumping light) with a given frequency $\nu_O$ is projected, we will find a group of lights with frequencies $\nu_O-\nu_i$ (the first Stokes light), $\nu_O-2\nu_i$, $\nu_O-3\nu_i$, etc. as well as the pumping light. This phenomenon is known as the "Raman effect". The effect varies directly as the power density (defined as the light power per unit area) and the Raman gain of the substance which shows Raman effect (Raman substance) jointly and it is also varies directly with propagation distance in the substance. Silica used as the material of the optical fiber itself exhibits the Raman effect, and generates a first Stokes light having a wavelength of 1.12 μm, in the case of using a YAG laser oscillating with a wavelength of 1.06 μm. A weak light of several watts scarcely causes Raman effect in ordinary condition, but within an optical fiber the light is concentrated in an optical guide of diameter less than 10 μm, so that even weak input light will have a large value of power density, or power per unit area. Moreover, since the light propagates over several kilometers in an optical fiber having little loss, an optical fiber made of Raman substance has a very long length, facilitating occurrence of the Raman phenomenon. It is already reported that several watts of light cause Raman effect within an optical fiber.

The conversion efficiency of pumping light to the first Stokes light is much enhanced when light having a frequency $\nu_O-\nu_i$ (the first Stokes light) together with the pumping light is incident on a Raman substance. This phenomenon is termed induced Raman effect.

This invention applies this induced Raman effect in an optical fiber to effect amplification of signal light. An embodiment of this invention will be explained below with reference to the accompanying drawings.

Figure 1:
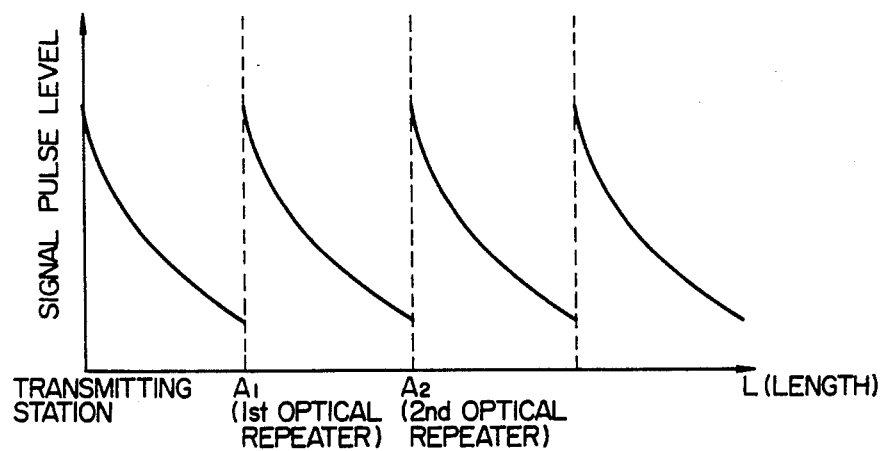
FIG. 1 is a characteristic curve which gives the relation between the signal pulse level and the fiber length of the prior art optical repeater.
Figure 2:
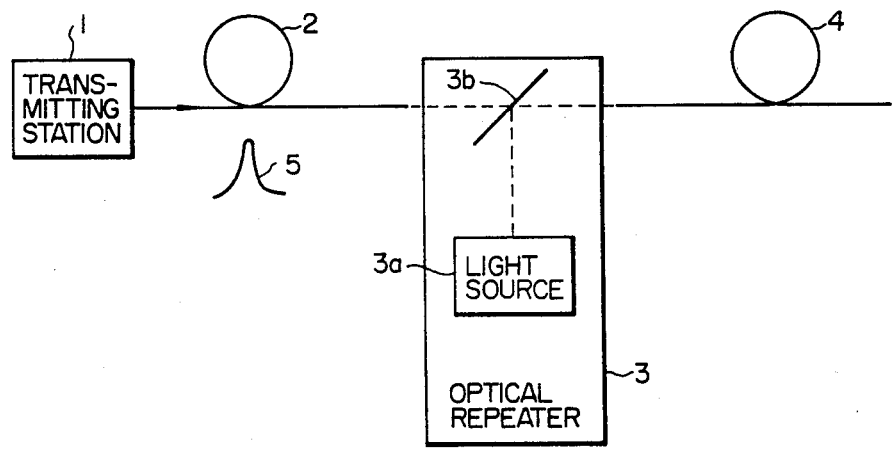
FIG. 2 is a brief illustration of the optical repeater which is an embodiment of this invention.

In FIG. 2, a signal light pulse 5 (its frequency is $\nu_O-\nu_i$), modulated at a transmitting station 1 and fed along optical fiber 2, enters an optical repeater 3, which has a light source 3a for emitting light at a frequency $\nu_O$ which is to be converted to a first Stokes light (frequency $\nu_O-\nu_i$) in the optical fiber, and a beam splitter 3b consisting, for example, of a half-mirror. The signal light pulse 5 fed to the optical repeater 3 is sent out over an optical fiber 4 after being synthesized at the beam splitter 3b with the pumping light having frequency $v_O$ emitted from the pumping light source 3a. The pumping light with its frequency $v_O$, supplied from the pumping light source 3a, is efficiently converted, by the induced Raman effect of the fiber, to a signal pulse only when it is propagated together with the signal light pulse along the optical fiber 4. That means, the signal light pulse is amplified by the induced Raman effect of the fiber.

Figure 3:
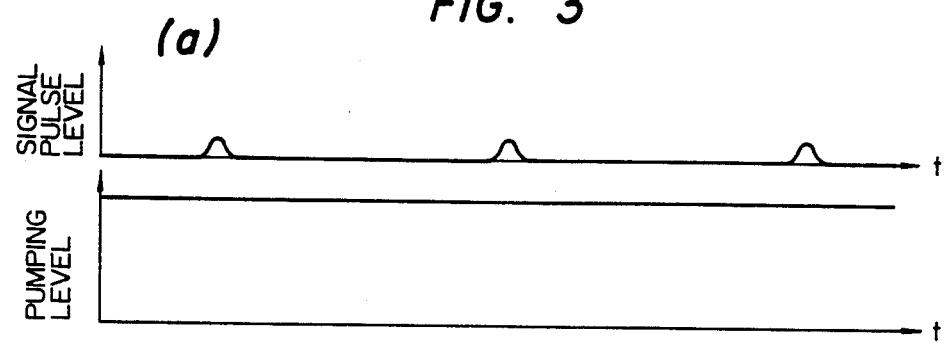
FIG. 3 is a timing chart for use in explanation of the amplification process of the signal light according to the present invention, FIG. 3(a) showing wave forms of the pumping light (CW operation) and the signal light before being combined, and FIGS. 3(b) and 3(c) showing relationship between the signal light pulse and the pumping light when the former is amplified by the latter.
Figure 3:
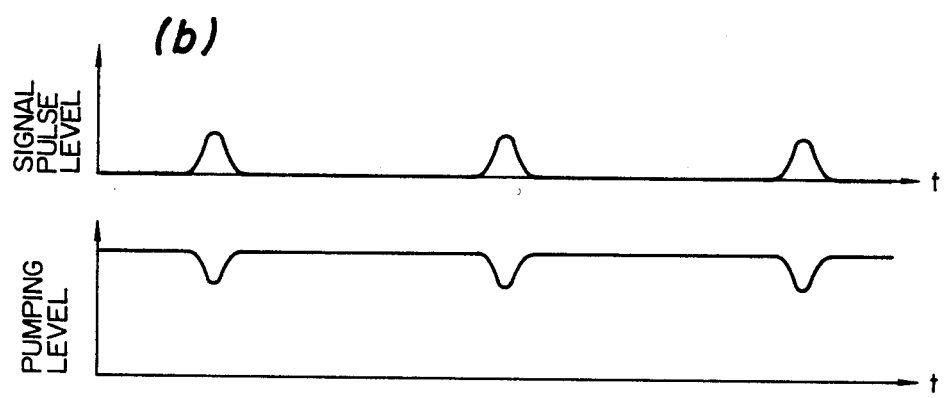
Figure 3:
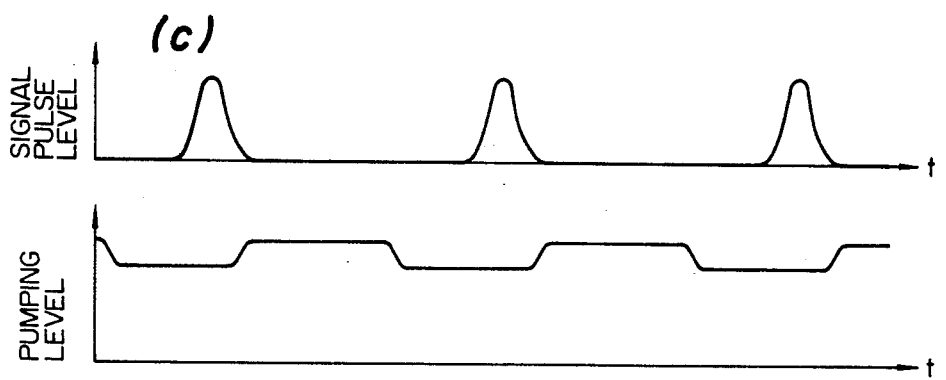

Next, with reference to FIG. 3, an explanation will be made about how the pumping light produced by a continuous oscillation amplifies the signal light pulse. FIG. 3(a) shows wave forms of the pumping light and the signal light pulse before it is synthesized at the beam splitter 3b shown in FIG. 2. These two lights synthesized at the beam splitter 3b propagate at the same time through the optical fiber 4 and the signal light pulse is amplified by the induced Raman effect that occurs within the optical fiber as shown in FIG. 3(b). Concurrently, the energy level of the pumping light is lowered because the energy therein is converted to that of the signal light pulse.

The optical fiber has dispersion characteristic, that is, the propagation velocity varies with the wavelength of light in the optical fiber. This is the reason why, in the existing optical fiber, there are velocity differences of about 1.5 nano seconds per kilometer between the signal light pulse of the wave length 1.12 $\mu$m and the pumping light of wavelength 1.06 $\mu$m. The positional relation between the pumping light and the signal light pulse is shifted as these lights travel as shown in FIG. 3(c).

For a transmission velocity of 300 megabits per second and the inter-repeater distance of 100 kilometers, for example, a time difference of 150 nsec is produced between the pumping light and the signal light pulse on the way from one repeater to next one. Since the inter-pulse time of the signal light pulses is about 3.3 n sec., about 45 pulses pass a certain point of the pumping light while they travel 100 Km.

In other words, the signal light pulse progresses with higher speed than the pumping light. As it progresses along the fiber, the signal light pulse gains energy from the pumping light, therefore the level of the signal light pulse is raised as shown in FIG. 3(c), while the pumping light, giving its energy to the signal pulse, advances with lower speed than the signal light pulse, and hence its average energy level is lowered in the course of the propagation as shown in the figure.

According to the optical repeater system of the present invention where the signal light is amplified in the manner mentioned above, the pumping light may be oscillated continuously and not need to be modulated. Since almost all the energy of the continuously oscillated pumping light is contributed to the amplification of the signal light pulse, a high energy conversion efficiency can be expected.

Figure 4:
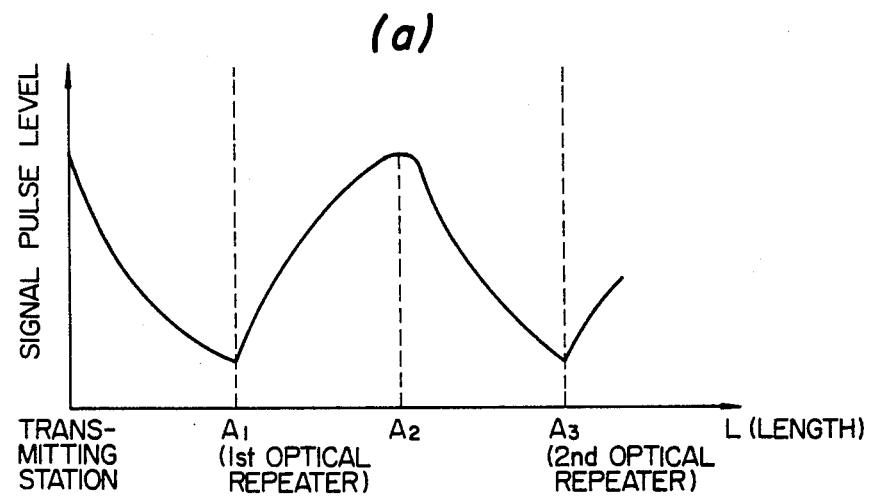
FIG. 4(a) is a characteristic curve indicating the relation between the signal pulse level and the fiber length.
FIG. 4(b) is a characteristic curve indicating the relation between the pumping level and the fiber length of the optical repeater system of this invention.
Figure 4:
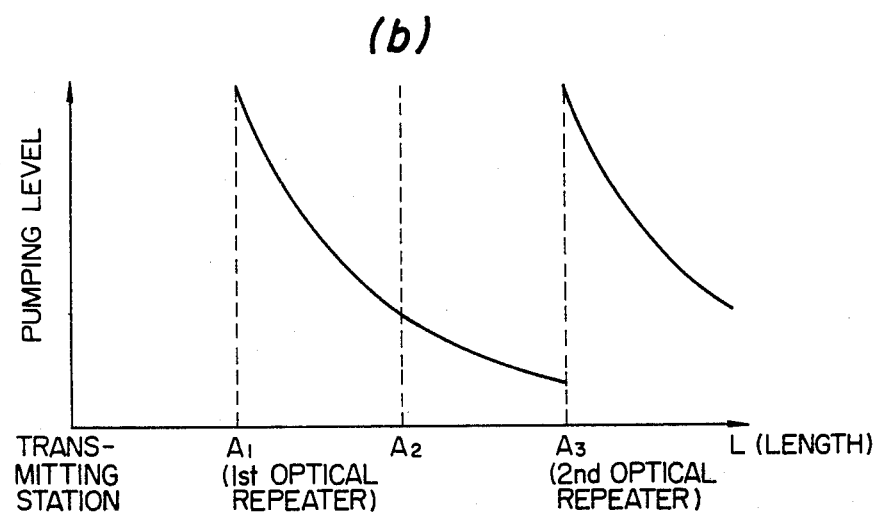

Next, an amplification process within an optical fiber according to this invention will be explained with reference to FIG. 4, where FIG. 4(a) depicts the energy level change of the signal light pulse in an optical repeater system of this invention. The orthogonal axis indicates signal pulse level, and the abscissa L indicates the length of the optical fiber from the transmitting station. As shown in FIG. 4(a), the signal light pulse sent from the transmitting station loses its energy in the optical fiber and attenuates exponentially in proportion to the fiber length until it reaches the first repeater $A_1$. If the signal pulse is synthesized with the pumping light at the first optical repeater $A_1$ of this invention, the attenuated signal pulse is continuously amplified by the induced Raman effect in the optical fiber until it reaches a point $A_2$ which is spaced by a certain distance from the first optical repeater $A_1$.

Concurrently, the pumping light applied to the first optical repeater $A_1$ is continuously attenuated because of the power migration to the signal light pulse and the loss in the optical fiber as shown in FIG. 4(b), and after the point $A_2$, its energy level has been so reduced that it does not cause the induced Raman effect. Consequently, the signal light pulse (FIG. 4(a)), losing its energy due to the optical fiber, attenuates exponentially as it propagates from the point $A_2$ to the second optical repeater $A_3$.

As mentioned above, the manner of signal amplification according to this invention is quite different from the conventional manner. Comparison of FIG. 1 to FIG. 4(a) clearly shows that, in the conventional method, the amplification is carried out at a single point where an optical repeater is present, whereas in the present embodiment, the amplification is performed in the fiber extending from the optical repeater to a certain downstream point $A_2$ along the fiber.

In the present embodiment, the calculated interval between adjacent optical repeaters $A_1$ and $A_2$ is 120 Km, for such values as 1 watt of input pumping light to the optical fiber, 0.5 dB/Km of optical fiber loss, and $0.92 \times 10^{-11}$ cm/W of optical fiber Raman gain, and $-40$ dBm ($1 \times 10^{-7}$ W) of signal pulse level in the first optical repeater $A_1$.

Figure 5:
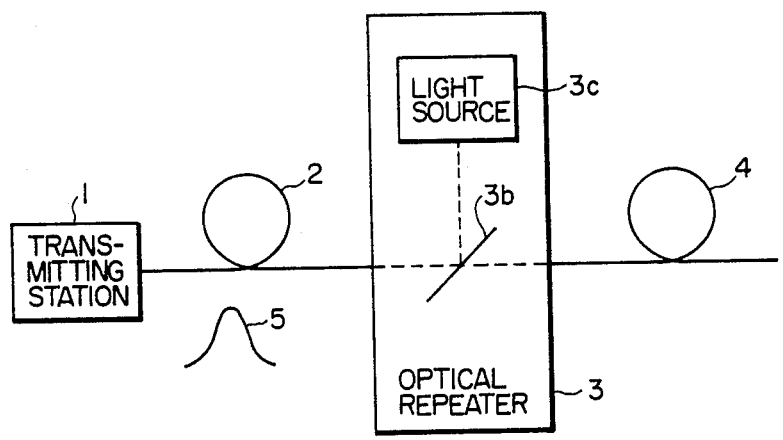
FIGS. 5 through 8 are brief illustrations of other embodiments of this invention.

Next, a second embodiment of this invention will be explained with reference to FIG. 5. A difference of this embodiment from the first embodiment explained with reference to FIG. 2 is that the pumping light emitted from the light source 3c of the optical repeater 3 travels through the optical fiber 2 toward the transmission station 1.

Operation of this second embodiment will be set forth below. The light source 3c emits a pumping light at a frequency $v_0$ which is to be converted to a first Stokes light (frequency $v_O-v_i$) in the optical fiber. This pumping light, introduced by a beam splitter 3b consisting, for example, of a half mirror to the optical fiber 2, progresses toward the transmitting station 1. The signal light pulse 5 having its frequency $v_O-v_i$, generated at the transmitting station 1, propagates along the optical fiber 2 and advances toward the optical repeater 3. The signal light pulse 5, therefore, meets with the pumping light in the optical fiber 2 so that it is amplified due to the Raman effect, as explained above.

The induced Raman effect of the first embodiment is called a forward stimulated Raman effect because the signal light pulse travels in the same direction as the pumping light, while the induced Raman effect of the second embodiment is called a backward stimulated Raman effect because the signal light pulse travels in the opposite direction to the pumping light.

Figure 6:
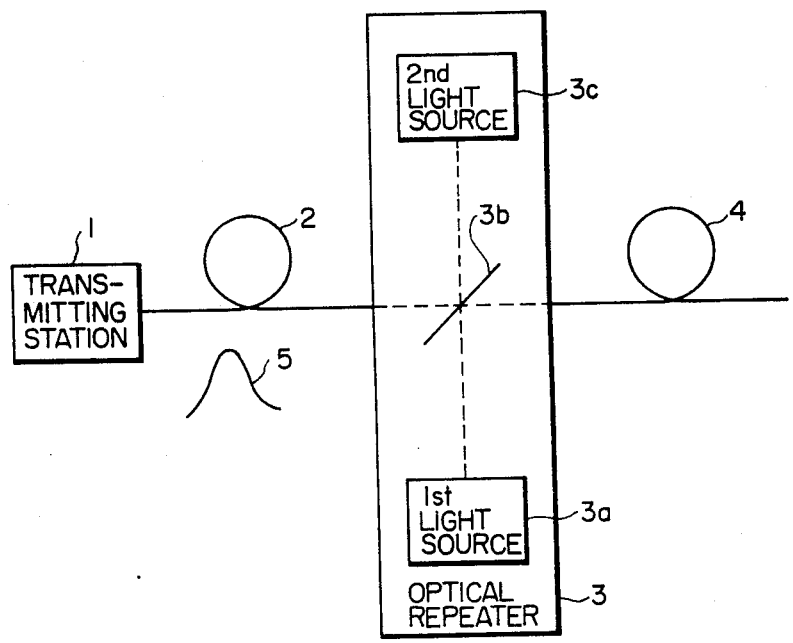

FIG. 6 shows a third embodiment of this invention. The induced Raman effect of this embodiment is a combination of a forward and a backward stimulated Raman effect. On one hand, the first pumping light supplied from the first light source 3a enters the optical fiber 4 and travels in the forward direction along the optical fiber 4 as explained with respect to the first embodiment. On the other hand, the second pumping light from the second light source 3c entering the optical fiber 2 travels in the backward direction along the optical fiber 2 as explained with respect to the second embodiment. Consequently, the signal light pulse 5 produced at the transmitting station 1 is amplified in both optical fibers 2 and 4.

Figure 7:
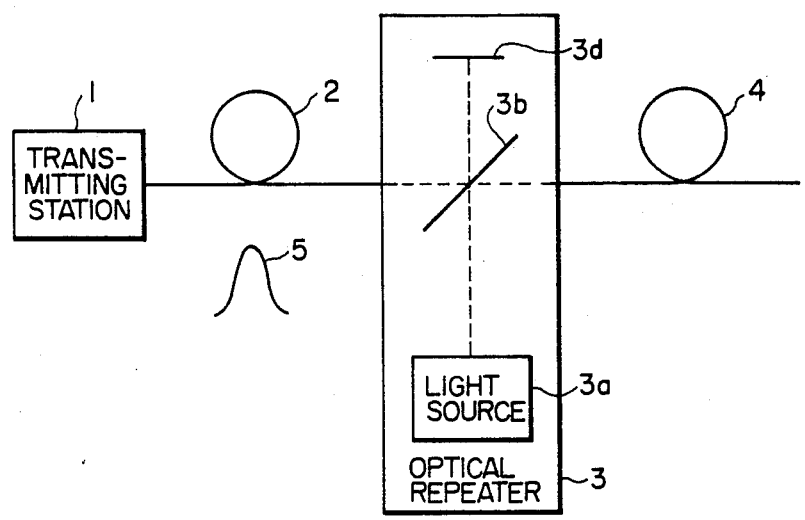

FIG. 7 shows a fourth embodiment of this invention. This embodiment provides a combination of a forward and a backward stimulated Raman effect as in said third embodiment, and utilizes a light reflection plate 3d such as a mirror or a prism to reflect the pumping light through the beam splitter 3b.

Figure 8:
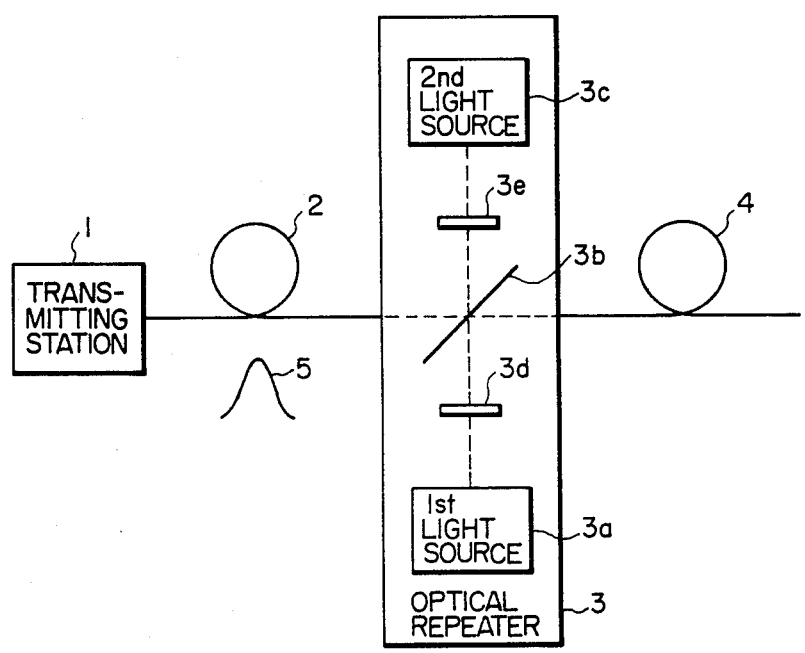

FIG. 8 shows a fifth embodiment of this invention, in which polarization elements 3e and 3d are inserted between the light sources 3a, 3c and the beam splitter 3b so as to prevent their mutual interference.

In each embodiment described above, the explanation contemplated that the first Stokes light was used, but the present invention is applicable to embodiments utilizing a second or any other higher order Stokes light or anti-Stokes light.

As long as the light source of the transmitting station supplies a single wave length in each embodiment of the optical repeater for the optical communication according to this invention mentioned above, no problem arises, but when the source supplies light containing plural wavelengths, the wave distortion of the signal light raises a problem.

Referring to FIG. 9(a), if a light pulse $a_1$ given by a synthesis of a light pulse $a_2$ with its wave length $\lambda_1$ and a light pulse $a_3$ with its wave length $\lambda_2$ is transmitted from a transmitting station for a long distance communication through an optical fiber, the optical pulse $b_1$ received at the receiving station is distorted because of the dispersion characteristic of the optical fiber as shown in FIG. 9(b). The wave distortion of the optical pulse $b_1$ narrows the transmission band of the optical communication system.

This problem is resolved by the optical communication system of FIG. 10, where the numerical notation 1a denotes the light source of the transmitting station, the notations 6, 8 and 9 identify optical fibers, notation 7 identifies an optical equalizer, notation 10 identifies a receiving station, notation 10a identifies an optical detector, and the other notations indicate the same parts as those in FIG. 2. In this optical communication system, the distorted wave form of the signal light pulse is shaped to the pulses $b_2$ and $b_3$ of FIG. 9(b), by the optical equalizer 7 being added to the optical repeater system consisting of optical fibers 2, 4 and optical repeater 3.

As the signal light pulse after equalization, either of the shaped pulses $b_2$ and $b_3$ may be used, thereby eliminating the inconvenience that the transmission bandwidth of the optical communication system is narrowed. For the optical equalizer, any existing light-electricity-light equalization methods are available. In said optical communication system, an optical equalizer 7 is provided separately from the optical repeater 3, but the repeater 3 itself may have a light equalizing function.

As is mentioned above, according to this invention, the low loss and the induced Raman effect of the optical fiber provide an optical amplifier system so that no electric signal processing circuit is needed in the optical repeaters.

In comparison with the conventional systems, the system of the present invention, therefore, is less probable to have optical repeater troubles, has no need to modulate the light of the optical repeater light source, and achieves a much more stable and reliable optical repeater system.

What we claim are:

1. An optical repeater system for optical communication comprising a light source for emitting a pumping light of frequency $\nu_O$, means for providing an optical communication signal light, an optical fiber, and a beam splitter synthesizing and directing the pumping light and the optical communication signal light into said optical fiber for concurrent propagation through said fiber, the optical communication signal light containing a frequency component of a Stokes light to be induced by said pumping light due to the Raman effect in the optical fiber, the pumping light and optical communication signal light interacting with one another in said optical fiber whereby the induced Raman effect and the dispersion characteristic of said optical fiber function to amplify the optical communication signal light.

2. An optical repeater system for optical communication according to claim 1, wheren said induced Raman effect is a forward stimulated Raman effect.

3. An optical repeater system for optical communication according to claim 1, wherein said induced Raman effect is a backward stimulated Raman effect.

4. An optical repeater system for optical communication according to claim 1, wherein said induced Raman effect is a combination of a forward and a backward stimulated Raman effects.

5. An optical repeater system for optical communication according to any one of claims 1 or 2 through 4, further comprising an optical equalizer, having a light equalizing function, incorporated in the optical repeater system for optical communication.

* * * * *